US009705321B1

United States Patent
Frink et al.

(10) Patent No.: US 9,705,321 B1
(45) Date of Patent: Jul. 11, 2017

(54) POWER SOURCE REDUNDANCY IN A POWER SUPPLY

(71) Applicant: Amazon Technologies, Inc., Reno, NV (US)

(72) Inventors: Darin Lee Frink, Lake Tapps, WA (US); Peter G. Ross, Olympia, WA (US)

(73) Assignee: Amazon Technologies, Inc., Seattle, WA (US)

( * ) Notice: Subject to any disclaimer, the term of this patent is extended or adjusted under 35 U.S.C. 154(b) by 72 days.

(21) Appl. No.: 14/265,686

(22) Filed: Apr. 30, 2014

Related U.S. Application Data

(63) Continuation of application No. 12/980,002, filed on Dec. 28, 2010, now Pat. No. 8,736,107.

(51) Int. Cl.
*H02J 1/10* (2006.01)
*H02J 1/00* (2006.01)

(52) U.S. Cl.
CPC . *H02J 1/00* (2013.01); *H02J 1/10* (2013.01)

(58) Field of Classification Search
CPC ..... H01M 2/10; G06F 1/26; H01J 7/35; H02J 1/102; G05F 1/70; Y02E 60/12
USPC ...... 307/43, 64, 9.1, 10.1, 66; 361/624, 622; 429/7; 320/101
See application file for complete search history.

(56) References Cited

U.S. PATENT DOCUMENTS

| | | | |
|---|---|---|---|
| 5,761,084 A | 6/1998 | Edwards | |
| 7,554,828 B2 | 6/2009 | Wilson | |
| 7,633,181 B2 | 12/2009 | Gross et al. | |
| 2005/0134239 A1* | 6/2005 | Harris | H02J 1/10 323/210 |
| 2006/0198225 A1 | 9/2006 | Spengler | |
| 2011/0006600 A1* | 1/2011 | Fontana | H02J 1/10 307/25 |
| 2011/0014501 A1* | 1/2011 | Scheucher | B60K 1/04 429/7 |

* cited by examiner

*Primary Examiner* — Rexford Barnie
*Assistant Examiner* — Jagdeep Dhillon
(74) *Attorney, Agent, or Firm* — Thomas Horstemeyer, LLP

(57) ABSTRACT

Disclosed are various embodiments of power source redundancy in a power supply for a rack mounted computing device. The power supply includes a plurality of AC power converters configured to receive power from corresponding power sources. A first AC power converter provides DC power to a common DC bus of the power supply. A second AC power converter provides DC power to the common DC bus in response to a change in the voltage level provided by the first AC power converter.

18 Claims, 3 Drawing Sheets

POWER SOURCE REDUNDANCY IN A POWER SUPPLY

CROSS-REFERENCE TO RELATED APPLICATIONS

This application is a continuation of, and claims priority to, co-pending U.S. Patent Application entitled "POWER SOURCE REDUNDANCY IN A POWER SUPPLY" having Ser. No. 12/980,002, filed on Dec. 28, 2010, which is hereby incorporated by reference in its entirety.

BACKGROUND

In large scale computing centers, it is possible that thousands of servers may be running at a single time. Typically, servers include a single AC power input that may be mechanically switched between separate AC power sources to provide for power input redundancy. This ensures that if one of the AC power sources goes down, power to the servers can be quickly restored to continue operation. However, the expense and reliability of the switching device can make such a system undesirable.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

According to various embodiments, various systems and methods are employed to ensure power redundancy for computing devices. Commonly, various rack mounted computing devices such as those in server banks and the like each include a single AC power input that is connected to an AC power source through a mechanical automatic transfer switch (ATS). Ideally, the ATS switches from a primary power source to a secondary power source when the primary power source goes down. However, switching delays and transition effects may result in shutdown of the computing devices. Thus, removing the expensive and somewhat unreliable ATSs may be advantageous. Various approaches are described herein to ensure that power is maintained in a rack mounted computing device (e.g., a server) by internally transitioning between two or more power inputs of the computing device. In the following discussion, a general description of the system and its components is provided, followed by a discussion of the operation of the same.

Figure 1:
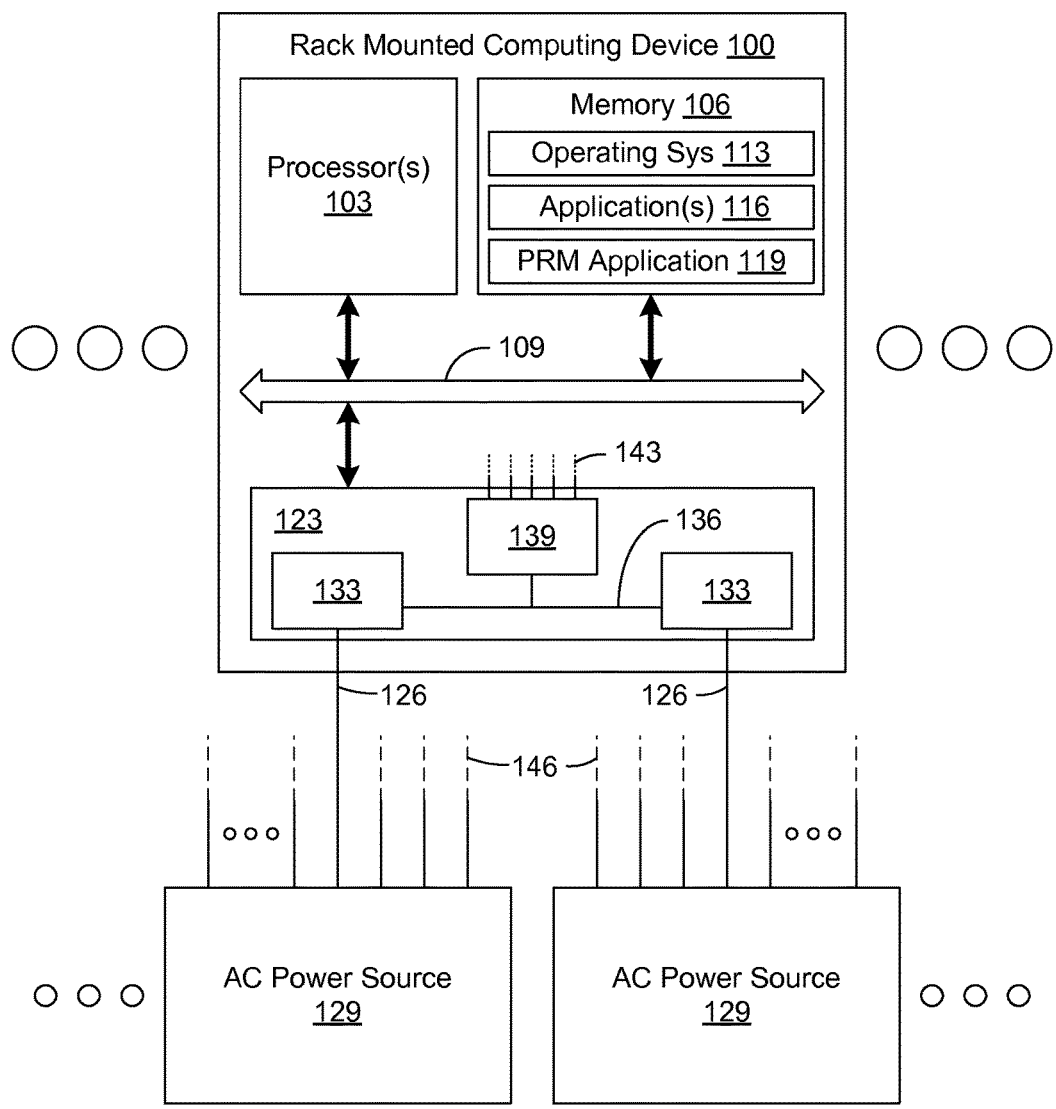
FIG. 1 is a drawing of one example of a computing device with multiple power inputs according to various embodiments of the present disclosure.

With reference to FIG. 1, shown is a rack mounted computing device 100 according to various embodiments. The rack mounted computing device 100 may comprise, for example, a server or any other device providing computing capability. According to various embodiments, a plurality of computing devices 100 may be employed that are arranged, for example, in one or more server banks or computer banks or other arrangements. For example, a plurality of computing devices 100 together may comprise a cloud computing resource, a grid computing resource, and/or any other distributed computing arrangement. Such rack mounted computing devices 100 may be located in a rack at a single installation or may be distributed among multiple racks at the same or many different geographical locations. For purposes of convenience, the computing device 100 is referred to herein in the singular. Even though the computing device is referred to in the singular, it is understood that a plurality of computing devices 100 may be employed in the various arrangements, as described above.

The rack mounted computing device 100 includes at least one processor circuit, for example, having a processor 103 and a memory 106, both of which are coupled to a local interface 109. To this end, the computing device 100 may comprise, for example, at least one server or like computing device. The local interface 109 may comprise, for example, a data bus with an accompanying address/control bus or other bus structure as can be appreciated. The computing device 100 may also include communication interfaces for interactions with other computing devices or management systems.

Stored in the memory 106 are both data and several components that are executable by the processor 103. In particular, stored in the memory 106 and executable by the processor 103 are an operating system 113, various applications 116, and potentially other applications. The applications 116 generally comprise primary applications run on the computing device 100 to accomplish various purposes. In some embodiments, the memory 106 may also store a power redundancy monitoring (PRM) application 119. Also stored in the memory 106 may be a data store and other data.

The rack mounted computing device 100 includes a power supply 123 having two or more power inputs 126 that supply power from corresponding AC power sources 129 through a bus connection or other appropriate circuit connection. The power inputs 126 provide power to corresponding AC power converters 133, which are configured to convert AC power to DC power and to provide the DC power to a common DC bus or rail 136 in the power supply 123. For example, the AC power converters 133 may include a rectifier circuit to convert AC power to DC power. In some embodiments, a boost and/or a buck circuit may be used to adjust the DC voltage to a desired level. In one implementation, the AC power converters 133 are configured to convert 208-240 VAC power to DC power at a predefined voltage level (e.g., 400 VDC) and to provide it to the common DC bus 136. A DC voltage regulator 139, included in the power supply 123, provides one or more DC voltages 143 to the computing device 100 for operation. The DC voltage regulator 139 adjusts the DC bus voltage to provide the DC power to the computing device at predefined voltage levels through DC buses or rails. While a single DC voltage regulator 139 is depicted, in other embodiments a plurality of DC voltage regulators 139 may be utilized to supply power at the predefined voltage levels. For example, different elements within the computing device 100 may receive power from one or more corresponding DC voltage regulators 139.

Figure 2:
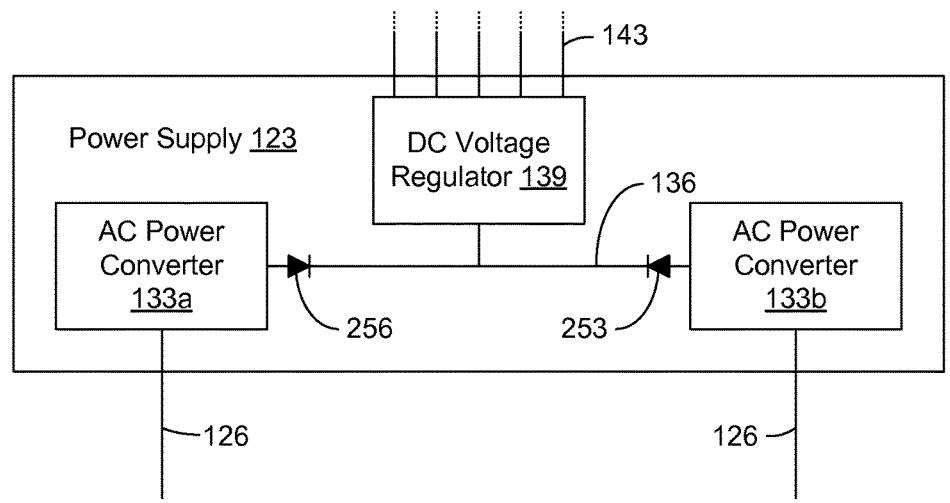
FIG. 2 is a drawing of an example of a power supply of the computing device of FIG. 1 according to various embodiments of the present disclosure.
Figure 3:
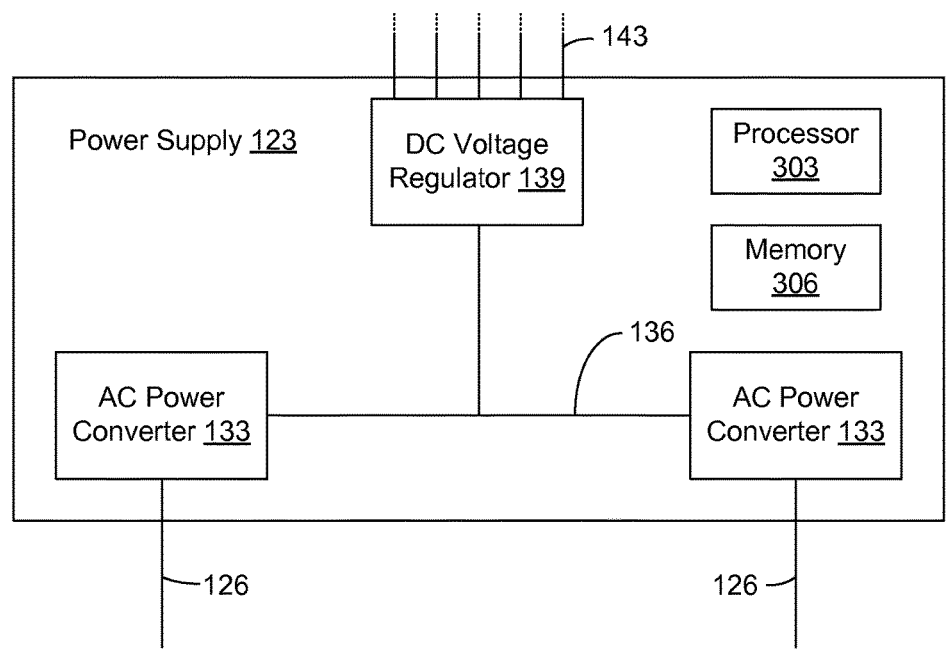
FIG. 3 is a drawing of another example of a power supply of the computing device of FIG. 1 according to various embodiments of the present disclosure.

For purposes of illustration, FIGS. 1-3 show various embodiments of the rack mounted computing device 100 and other such devices having two power inputs 126. However, where two power inputs 126 to a respective device are shown and discussed herein, the recitation of two power inputs 126 as such is merely representative of the fact that more than two power inputs 126 may also be employed. Accordingly, in any embodiment described herein, two or more power inputs 126 may be used, where any power input 126 in addition to two provides greater power source redundancy as can be appreciated.

Each of the power sources 129 may be configured to supply power to multiple computing devices 100 as shown. Alternatively, in the various embodiments described herein, the single power source 129 may be viewed as representing multiple parallel power sources that each couple to one of the power inputs 126. In some implementations, a power source 129 may be the primary supply for one or more computing device(s) 100 and the backup supply for other computing device(s) 100. The computing devices 100 may be assigned to balance loading of the power sources 129 during normal and backup operation.

Each of the power inputs 126 may comprise, for example, a receptacle into which a power line 146 such as a power cord is plugged. In some embodiments, the power lines 146 may represent a quick disconnect blade-type or pin-type connection within a mounting rack that, when the computing device 100 is inserted into the rack, detachably connects the power supply 123 to the power sources 129. Alternatively, the power line 146 may be hard wired to the power supply 123 or other circuitry in the computing device 100.

A first AC power converter 133 acts as a primary supply to the common DC bus 136, while the other AC power converter 133 acts as a backup supply. For example, in the embodiment of FIG. 1, one AC power converter 133 is the primary supply that provides all DC power while the other backup AC power converter 133 remains idle. While idle, the backup AC power converter 133 may not provide any power to the common DC bus 136. When the primary supply fails (e.g., upon loss of the corresponding AC power source 129 or failure of the primary AC power converter 133), the backup AC power converter 133 assumes the system load by providing power to the common DC bus 136. As can be understood, a power supply 123 may include two or more backup AC power converters 133 to provide additional redundancy for the computing device 100.

With reference to FIG. 2, shown is an example of the power supply 123 of the rack mounted computing device 100 (FIG. 1). In the embodiment of FIG. 2, the power supply 123 includes a primary AC power converter 133*a* configured to provide power to the common DC bus 136 at a first voltage level and a backup AC power converter 133*b* configured to provide power to the common DC bus 136 at a second voltage level that is less than the first voltage level. A diode 253 is included between the backup AC power converter 133*b* and the common DC bus 136. During operation, the primary AC power converter 133*a* supplies power to the computing device 100 via the common DC bus 136 and the DC voltage regulator 139. Because the backup AC power converter 133*b* operates at a lower voltage level, no power is provided by the backup converter 133*b*. The reverse biased diode 253 prevents the flow of current into the backup AC power converter 133*b*.

When the voltage level of the primary AC power converter 133*a*, and thus the common DC bus 136, falls below the second voltage level of the backup AC power converter 133*b* (e.g., when the primary AC power converter 133*a* or the corresponding AC power source 129 fails), the diode 253 is forward biased, and the backup AC power converter 133*b* supplies power to the computing device 100 via the common DC bus 136 and the DC voltage regulator 139. The implementation of FIG. 2 allows for a smooth transition of load from the primary AC power converter 133*a* to the backup AC power converter 133*b*. Reactive elements such as inductors and capacitors may be included in the AC power converters 133 and/or on the common DC bus to reduce transient effects such as current spikes and voltage dips. When the power from the primary AC power converter 133*a* is restored, the diode 253 is again reverse biased, and the backup AC power converter 133*b* returns to an idle state.

A second diode 256 may also be connected between the primary AC power converter 133*a* and the common DC bus 136 as illustrated in FIG. 2. When the primary AC power converter 133*a* is supplying power to the common DC bus 136, the second diode 256 is forward biased. When the voltage level of the primary AC power converter 133*a* falls below the second voltage level of the backup AC power converter 133*b* (e.g., during failure of the AC power source 129), the diode 256 becomes reverse biased and prevents the flow of current into the primary AC power converter 133*a*. When the power from the primary AC power converter 133*a* is restored, the diode 256 is forward biased to supply power to the common DC bus 136, and the backup AC power converter 133*b* returns to an idle state.

In other embodiments, an isolation device (e.g., a switch, relay, or transistor) may be opened to disconnect and isolate the output of the primary AC power converter 133*a* from the common DC bus when the voltage drops below a predefined level or threshold. The isolation device may automatically reclose when the voltage level is restored to above the same or another predefined level or threshold. In some implementations, the isolation device may use a manual reset to allow reclosing.

Referring back to FIG. 1, other embodiments of the rack mounted computing device 100 may include a power redundancy monitoring application 119. When implemented by the processor 103, the power redundancy monitoring (PRM) application 119 monitors operation of the power supply 123 such as voltage levels and/or rates of change. The power redundancy monitoring application 119 may also control operation of the AC power converters 133 as will be discussed. In alternative embodiments, such as that illustrated in FIG. 3, the power supply 123 also includes memory 306 and a processor 303 that can store and implement the power redundancy monitoring application 119.

In the embodiments of FIGS. 1 and 3, a primary AC power converter 133 supplies the common DC bus 136 at a first voltage level to provide power to the computing device 100. The first voltage level may be set by the circuitry of the primary AC power converter 133 or may be controlled by the PRM application 119. For example, the voltage may be set by the switching interval of the primary AC power converter 133. The switching interval may be fixed to provide a predefined voltage level or may be variable to allow for adjustment of the voltage level. Reactive elements may be included in the primary AC power converter 133 to smooth out variations in the supplied DC power. For example, a capacitor may be included to reduce voltage variations on the common DC bus 136, and an inductor may be included to reduce high rates of change in the supply current.

If the output voltage of the primary AC power converter 133 on the common DC bus 136 begins to drop, the circuitry of the primary AC power converter 133 and/or the PRM application 119 may automatically adjust the switching interval in an attempt to maintain the first voltage level. If the output voltage of the primary AC power converter 133 falls below a second predefined voltage level or threshold, then the backup AC power converter 133 begins providing power to the common DC bus 136. Reactive elements may be included in the backup AC power converter 133 to smooth out variations in the supplied DC power.

According to various embodiments, the PRM application 119 may monitor the rate of change in the voltage level of the common DC bus 136 and/or the output of the primary AC power converter 133. A rapid change in the voltage level may indicate excessive loading of the primary AC converter 133 or a failure of the primary AC converter 133 and/or the corresponding AC power source 129. If the rate of change in the voltage exceeds a predefined value or threshold, then the backup AC power converter 133 begins providing power to the common DC bus 136.

In some implementations, the primary AC power converter 133 supplies all of the power to the computing device 100 while the backup AC power converter 133 remains idle without supplying any power. In other embodiments, the backup AC power converter 133 may provide a minimal amount of power when idle to reduce transient heating effects during load transfer to the backup AC power converter 133. In response to the voltage level or the rate of change in the voltage, the backup AC power converter 133 may assume the entire load while the primary AC power converter 133 becomes idle without supplying any power to the common DC bus 136. Alternatively, the backup AC power converter 133 may assume a portion of the load and the PRM application 119 may control load sharing between the primary and backup converters 133.

Embodiments of the present disclosure may also include combinations of elements of FIGS. 1-3. For example, the embodiment of FIG. 3 may also include a diode (e.g., diode 253 of FIG. 2) between the backup AC power converter 133 and the common DC bus 136 as illustrated in FIG. 2. Another diode and/or isolation device may also be included between the primary AC power converter 133 and the common DC bus 136.

Figure 4:
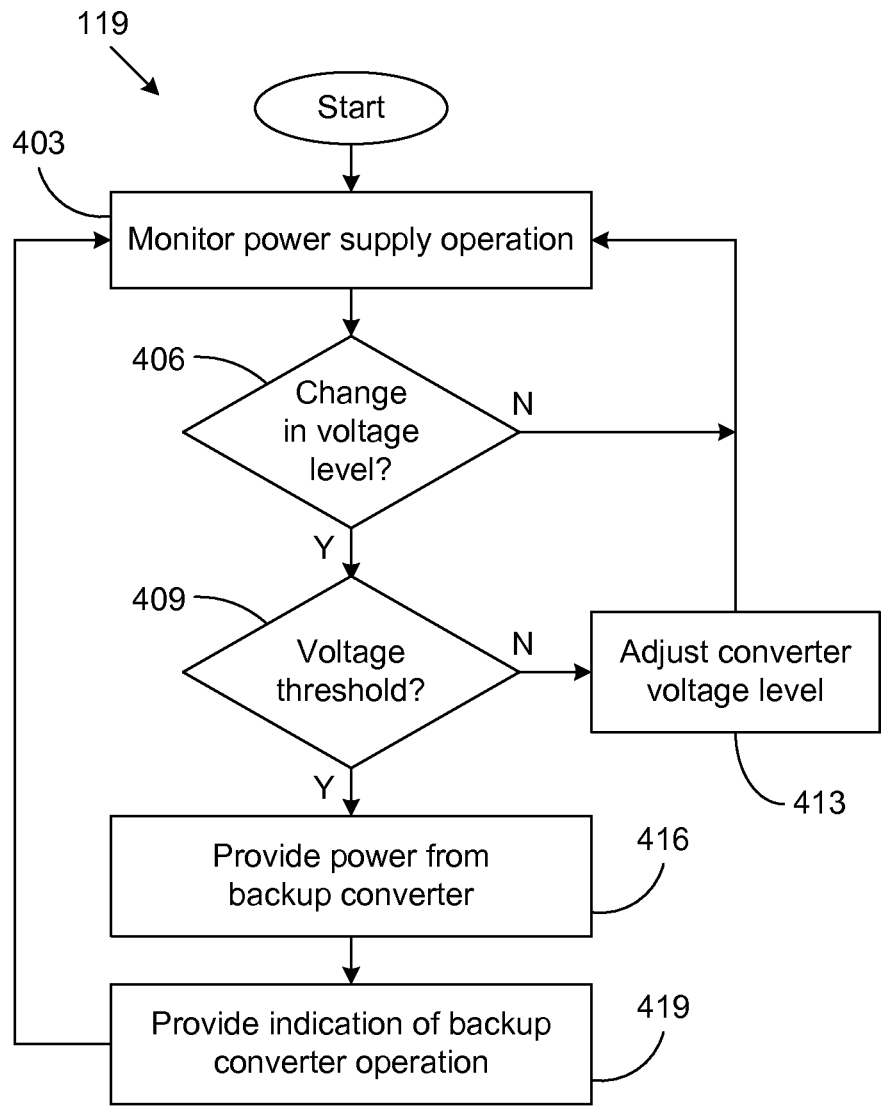
FIG. 4 is a flowchart illustrating one example of functionality of a power redundancy monitoring (PRM) application implemented in either of the processors of FIG. 1 or FIG. 3 according to various embodiments of the present disclosure.

Referring now to FIG. 4, shown is a flowchart illustrating one example of functionality of a power redundancy monitoring (PRM) application 119 implemented by either of the processors of FIG. 1 or FIG. 3 according to various embodiments of the present disclosure. It is understood that the flowchart of FIG. 4 provides merely an example of the many different types of functional arrangements that may be employed to implement the operation of the portion of the PRM application 119 as described herein. As an alternative, the flowchart of FIG. 4 may be viewed as depicting an example of steps of a method implemented in the rack mounted computing device 100 (FIG. 1) according to one or more embodiments.

Beginning with block 403, operation of the power supply 123 (FIGS. 1-3) is monitored. If no change in the voltage level is detected in block 406, then the PRM application 119 continues monitoring operation of the power supply in block 403. If a change is detected, then the PRM application 119 compares the voltage level of the common DC bus 136 (FIGS. 1-3) and/or of the primary AC power converter 133 (FIGS. 1-3) to a threshold in block 409. Alternatively, the rate of change of the voltage level may be compared to a threshold.

If the threshold is not breached, then the PRM application 119 may modify the operation of the primary AC power converter to adjust the voltage level in block 413 and return to monitoring the power supply operation in block 403. If the threshold has been breached, then the PRM application 119 provides power from a backup AC power converter 133 in block 416. The PRM application 119 may control the backup AC power converter 133 to provide all or a portion of the power for the computing device 100 while reducing or minimizing the transition effects such as current and/or voltage spikes. The PRM application 119 may then return to monitoring operation of the power supply 123 in block 403.

The PRM application 119 may also provide an indication of the operation of the backup AC power converter 133 in block 419 before returning to monitoring the power supply operation. Indications may include, for example, an audible alarm (e.g., using a speaker), a visual alarm (e.g., using a light indicator), a messaging alarm (e.g., an email, text message, or other type of message), a flag (e.g., a software variable indicating an alarm condition to a monitoring system), or other type of alarm. For example, the PRM application 119 may communicate an indication of backup AC power converter 133 operation to a power management application of a management system. The power management application may then inform system operators of the operation of the backup AC power converter 133 for appropriate action or may initiate actions in response to the indication. Indications from multiple computing devices 100 may aid in fault isolation and restoration of power sources.

Where any component discussed herein such as the PRM application 119 is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components may be stored in the memories 106, 306 and are executable by the respective processors 103, 303. In this respect, the term "executable" means a program file that is in a form that can ultimately be run by a respective one of the processors 103, 303. Examples of executable programs may be, for example, a compiled program that can be translated into machine code in a format that can be loaded into a random access portion of a respective one of the memories 106, 306 and run by a respective one of the processors 103, 303, source code that may be expressed in proper format such as object code that is capable of being loaded into a random access portion of a respective one of the memories 106, 306 and executed by a respective one of the processors 103, 303, or source code that may be interpreted by another executable program to generate instructions in a random access portion of a respective one of the memories 106, 306 to be executed by the respective processor 103, 303, etc. An executable program may be stored in any portion or component of a memory 106, 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Each of the memories 106, 306 is defined herein as including both volatile and nonvolatile memory and data storage components. Volatile components are those that do not retain data values upon loss of power. Nonvolatile components are those that retain data upon a loss of power.

Thus, each of the memories 106, 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 103, 303 may represent multiple processors and the memories 106, 306 may represent multiple memories that operate in parallel processing circuits, respectively. In such a case, each of the local interfaces 109 may comprise an appropriate network that facilitates communication between any two of the multiple processors between any processor and any of the memories, or between any two of the memories, etc. Each of the local interfaces 109 may comprise additional systems designed to coordinate this communication, including, for example, performing load balancing. Each processor 103, 303 may be of electrical or of some other available construction.

Although the PRM application 119 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of various embodiments of the PRM application 119 as described above. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 103, 303 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the PRM application 119, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

While the embodiments of FIGS. 1-4 are discussed with respect to a single backup AC power converter 133, a plurality of backup power converters 133 may also be utilized. Each of the backup AC power converters 133 may be configured to operate at a corresponding voltage level or may be controlled by the PRM application 119 to provide power to the common DC bus 136 as appropriate. The PRM application 119 may also control the backup AC power converters 133 to share the load of the computing device 100.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
 providing direct current (DC) power at a first voltage level to a common DC bus in a power supply in a rack mounted computing device, the DC power converted from alternating current (AC) power received from a first AC power source;
 providing regulated DC power from the common DC bus to elements of the rack mounted computing device; and providing DC power at a second voltage level to the common DC bus through a diode in response to the first voltage level dropping below the second voltage level, the DC power provided through the diode converted from AC power received from a second AC power source; and disconnecting a source of the DC power at the first voltage level from the common DC bus in response to comparison of the first voltage level to a predefined threshold.

2. The method of claim 1, wherein the regulated DC power is provided at a plurality of predefined voltages.

3. The method of claim 1, wherein the DC power at the first voltage level is provided to the common DC bus via a second diode.

4. The method of claim 1, further comprising coupling the power supply to the first and second AC power sources through a plurality of quick disconnect connectors.

5. The method of claim 1, wherein the source of the DC power at the first voltage level is a primary AC power converter and a source of the DC power at the second voltage level is a backup AC power converter.

6. The method of claim 1, wherein the rack mounted computing device is a rack mounted server.

7. A non-transitory computer readable medium embodying a program executable in at least one computing device, where execution of the program by the at least one computing device causes the at least one computing device to at least:

monitor a voltage level of direct current (DC) power provided to a common DC bus of a rack mounted computing device by a primary alternating current (AC) power converter receiving AC power from a first AC power source; and facilitate provision of DC power to the common DC bus by a backup AC power converter receiving AC power from a second AC power source in response to a change in the voltage level provided by the primary AC power converter; and disconnect the primary AC power converter from the common DC bus in response to a comparison of the voltage level to a predefined threshold.

8. The non-transitory computer readable medium of claim 7, wherein the at least one computing device is the rack mounted computing device.

9. The non-transitory computer readable medium of claim 7, wherein the program causes the at least one computing device to initiate provision of DC power from the backup AC power converter to the common DC bus in response to a change in the voltage level provided by the primary AC power converter breaching a predefined threshold.

10. The non-transitory computer readable medium of claim 9, wherein the program causes the at least one computing device to initiate provision of DC power from the backup AC power converter to the common DC bus in response to the voltage level provided by the primary AC power converter dropping below the predefined threshold.

11. The non-transitory computer readable medium of claim 9, wherein the program causes the at least one computing device to initiate provision of DC power from the backup AC power converter to the common DC bus in response to a rate of change in the voltage level provided by the primary AC power converter exceeding the predefined threshold.

12. The non-transitory computer readable medium of claim 9, wherein the program causes the at least one computing device to provide an indication of an operational status of the backup AC power converter in response to breaching the predefined threshold.

13. A method, comprising:

providing direct current (DC) power converted by a first alternating current (AC) power converter in a power supply in a rack mounted computing device, to a common DC bus in the power supply;

monitoring a voltage level provided by the first AC power converter; and in response to detecting a change in the voltage level provided by the first AC power converter, controlling provision of DC power converted by a second AC power converter in the power supply to the common DC bus, where the first AC power converter is disconnected from the common DC bus in response to the voltage level provided by the first AC power converter dropping below a voltage level of the second AC power converter.

14. The method of claim 13, wherein the first AC power converter receives power from one of a plurality of AC power sources, and the second AC power converter receives power from another one of the plurality of AC power sources.

15. The method of claim 13, wherein the provision of the DC power by the second AC power converter is initiated in response to a comparison of the voltage level provided by the first AC power converter to a predefined threshold.

16. The method of claim 13, wherein the provision of the DC power by the second AC power converter is initiated in response to a rate of change in the voltage level provided by the first AC power converter breaching a predefined threshold.

17. The method of claim 15, further comprising providing an indication of an operational status of the second AC power converter in response to the comparison of the voltage level provided by the first AC power converter to the predefined threshold.

18. The method of claim 17, wherein the indication is provided to a power management application.

* * * * *